United States Patent
Huang et al.

(10) Patent No.: US 7,869,230 B2
(45) Date of Patent: Jan. 11, 2011

(54) RESONANCE CIRCUIT FOR USE IN H-BRIDGE DC-DC CONVERTER

(75) Inventors: Yung-Fu Huang, Miaoli County (TW); Yoshihiro Konishi, Hsinchu (TW); Min-Ju Hsieh, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 358 days.

(21) Appl. No.: 12/144,891

(22) Filed: Jun. 24, 2008

(65) Prior Publication Data
US 2009/0167285 A1 Jul. 2, 2009

(30) Foreign Application Priority Data
Dec. 28, 2007 (TW) .............................. 96150759 A (51) Int. Cl.
*H02M 3/335* (2006.01)
(52) U.S. Cl. ............... 363/21.02; 363/17; 363/132; 363/134
(58) Field of Classification Search ............ 363/17, 363/18, 20, 21.01, 21.02, 123, 132, 134
See application file for complete search history.

(56) References Cited
U.S. PATENT DOCUMENTS 6,483,723 B2 * 11/2002 Kuranuki et al. ............. 363/17
6,876,556 B2 * 4/2005 Zhu et al. ..................... 363/17
2005/0041439 A1 * 2/2005 Jang et al. .................... 363/17

* cited by examiner

Primary Examiner—Bao Q Vu
Assistant Examiner—Nguyen Tran
(74) Attorney, Agent, or Firm—WPAT, PC; Justin King (57) ABSTRACT

The present invention discloses a resonance circuit for use in an H-bridge DC-DC converter, the resonance circuit comprising: an H-bridge converter, capable of converting unstable DC power into stable DC power; a first resonance circuit, disposed on a buck side of the H-bridge converter for reducing the turn-off loss of a first active switching element; and a second resonance circuit, disposed on a boost side of the H-bridge converter for reducing the turn-on loss of a second active switching element. The H-bridge converter comprises: a first active switching element and a second active switching element; a coupled inductor with dual windings capable of storing energy; and a first passive switching element and a second passive switching element. The first resonance circuit comprises: a first inductor, a second inductor, a first auxiliary inductor, a first passive switching element, a second passive switching element and a first auxiliary capacitor, wherein the second inductor comprises a primary winding and an auxiliary winding. The second resonance circuit comprises: a second auxiliary inductor, a third active switching element, a first auxiliary inductor, a first passive switching element, a fourth passive switching element, a third capacitor, a fourth capacitor and a second auxiliary capacitor.

7 Claims, 11 Drawing Sheets

RESONANCE CIRCUIT FOR USE IN H-BRIDGE DC-DC CONVERTER

BACKGROUND OF THE INVENTION

1. Field of the Invention

The present invention generally relates to a resonance circuit for use in an H-bridge DC-DC converter and, more particularly, to a resonance circuit for use in an H-bridge DC-DC converter capable of converting DC power from the renewable energy or distributed energy into AC power using a DC-DC converter and a DC-AC inverter so as to be fed into the AC utility power system. In the present invention, the resonance circuit for use in an H-bridge DC-DC converter comprises a first resonance circuit, disposed on a buck side of the H-bridge converter, capable of storing the energy in a passive capacitor when any of the active elements is switched and delivering the energy back to the input of the DC-DC converter using a resonance inductor; and a second resonance circuit, disposed on a boost side of the H-bridge converter, for reducing the turn-on loss of a second active switching element to achieve zero-voltage switching. Therefore, the resonance circuit of the present invention is characterized in that a resonance inductor is used to deliver the energy stored in the capacitor back to the input so as to reduce the switching loss and enhance the power conversion rate.

2. Description of the Prior Art

The H-Bridge DC-DC converter converts unstable DC distributed power and renewable power into stable DC power and then the DC-AC inverter inverts the DC power into AC power to be used with the AC utility.

Such an H-bridge DC-DC converter exhibits a wide operation range ($Vin_{max}/Vin_{min}$) so that there is flexibility in circuit design. However, switching loss such as turn-on loss and turn-off loss may result from hard-switching since active switching elements are used. Moreover, during hard-switching of the switches, switching surge occurs to shorten the lifetime of the switching elements.

Therefore, there is need in providing a resonance circuit for use in an H-bridge DC-DC converter to reduce the switching loss, improve the conversion rate and prolong the lifetime of the switching elements.

SUMMARY OF THE INVENTION

It is an object of the present invention to provide a resonance circuit for use in an H-bridge DC-DC converter using a resonance circuit to achieve soft-switching of the switches to reduce the switching loss and deliver part of the energy back to the AC utility and improve the power conversion rate.

It is another object of the present invention to provide a resonance circuit for use in an H-bridge DC-DC converter using capacitors and inductors in a resonance circuit to discharge the switches to zero-voltage to achieve zero-voltage switching, reduce switching loss and improve the power conversion rate.

In order to achieve the foregoing objects, the present invention provides a resonance circuit for use in an H-bridge DC-DC converter, the resonance circuit comprising:

an H-bridge converter, capable of converting unstable DC power into stable DC power, the H-bridge converter comprising:
  a first active switching element and a second active switching element;
  a coupled inductor with dual windings capable of storing energy; and
  a first passive switching element and a second passive switching element;
a first resonance circuit, disposed on a buck side of the H-bridge converter for reducing the turn-off loss of a first active switching element, the first resonance circuit comprising:
  a first inductor, a second inductor, a first auxiliary inductor, a first passive switching element, a second passive switching element and a first auxiliary capacitor;
  wherein the second inductor comprises a primary winding and an auxiliary winding; and
a second resonance circuit, disposed on a boost side of the H-bridge converter for reducing the turn-on loss of a second active switching element, the second resonance circuit comprising:
  a second auxiliary inductor, a third active switching element, a first auxiliary inductor, a first passive switching element, a fourth passive switching element, a third capacitor, a fourth capacitor and a second auxiliary capacitor.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by but not limited to the preferred embodiment as described hereinafter.

Figure 1:
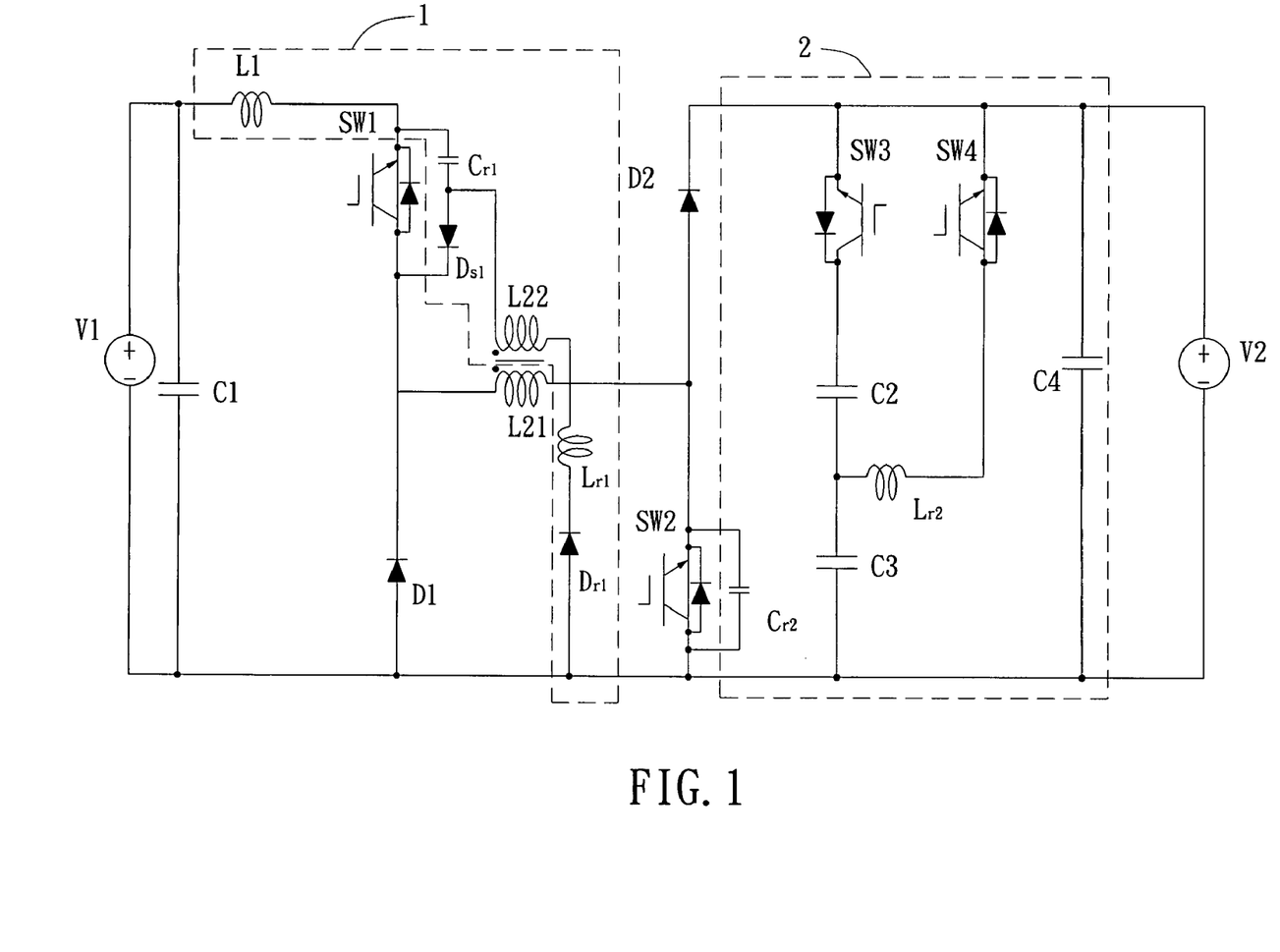
FIG. 1 is a circuit diagram of a resonance circuit for use in an H-bridge DC-DC converter according to the present invention.

Please refer to FIG. 1, which is a circuit diagram of a resonance circuit for use in an H-bridge DC-DC converter according to the present invention. In the present invention, the resonance circuit for use in an H-bridge DC-DC converter comprises an H-bridge converter and two resonance circuits.

The H-bridge converter is capable of converting unstable DC power into stable DC power. The H-bridge converter comprises: a first active switching element SW1 and a second active switching element SW2; a second inductor L2 with dual windings capable of storing energy; and a first passive switching element D1 and a second passive switching element D2.

The first resonance circuit (indicated by a dotted-line box labeled 1) comprises: a first and a second inductors (L1, L2), a first auxiliary inductor ($L_{r1}$), a first passive switching element $D_{s1}$ and a second passive switching element $D_{r1}$ and a first auxiliary capacitor $C_{r1}$. The second inductor L2 comprises a primary winding L21 and an auxiliary winding L22. The first auxiliary inductor $L_{r1}$ can be equal to the leakage inductance from auxiliary winding L22 of the second inductor L2.

The first resonance circuit 1, capable of reducing the turn-off loss of the first active switching element SW1, is disposed on a buck side of the H-bridge converter. A first auxiliary passive switching element $D_{s1}$ is connected in series to a first auxiliary capacitor $C_{r1}$, and connected in parallel to a first active switching element SW1. A first auxiliary inductor $L_{r1}$ and a second auxiliary passive switching element ($D_{r1}$) are added to reduce surge voltage by adjusting the first auxiliary capacitor $C_{r1}$ so that the turn-off loss of the first active switching element SW1 is reduced and the energy stored in the first auxiliary capacitor $C_{r1}$ can be delivered through the first auxiliary inductor $L_{r1}$ to the system by resonance to improve the power conversion rate.

To further improve the performance of the resonance circuit of the present invention, a first inductor L1 is capable of limiting the current variation so as to reduce the turn-on loss of the first active switching element SW1. However, the surge voltage resulting from the first inductor L1 increases the turn-off loss of the active switching elements. Therefore, the capacitance is required to be higher so as to reduce the surge voltage and the turn-on loss of the active switching elements and improve the power conversion rate.

The second resonance circuit (indicated by a dotted-line box labeled 2) comprises: a second auxiliary inductor $L_{r2}$, a third active switching element SW3, a fourth active switching element SW4, a second capacitor C2, a third capacitor C3, a fourth capacitor C4 and a second auxiliary capacitor $C_{r2}$.

The second resonance circuit 2, capable of reducing the turn-off loss of the second active switching element SW2, is disposed on a boost side of the H-bridge converter. The third active switching element SW3 and fourth active switching element SW4 enable the energy stored in the second auxiliary capacitor $C_{r2}$ to be delivered to the second auxiliary inductor $L_{r2}$ by the resonance of the second auxiliary capacitor $C_{r2}$ and the second auxiliary inductor $L_{r2}$, and then to the fourth capacitor C4 by the resonance of the second auxiliary inductor $L_{r2}$ and the fourth capacitor C4.

The first resonance circuit 1 and the second resonance circuit 2 are connected using: a first auxiliary capacitor $C_{r1}$ being connected in series to a first auxiliary passive switching element $D_{S1}$ connected in parallel to a first active switching element SW1; and the negative end of a second auxiliary passive switching element $D_{r1}$ being connected in series to the joint of the first auxiliary capacitor $C_{r1}$ and the first auxiliary passive switching element $D_{s1}$ through a first auxiliary inductor $L_{r1}$ and an auxiliary winding L22 of a second inductor L2 while the positive end of the second auxiliary passive switching element $D_{r1}$ being connected to the negative end of an input power V1.

The H-bridge converter is capable of operating in a buck mode and a boost mode. In the buck mode, the second active switching element SW2 is always turned off.

Buck Mode

The resonance circuit for use in an H-bridge DC-DC converter in FIG. 1 operates according to five operating steps as described hereinafter.

Figure 2:
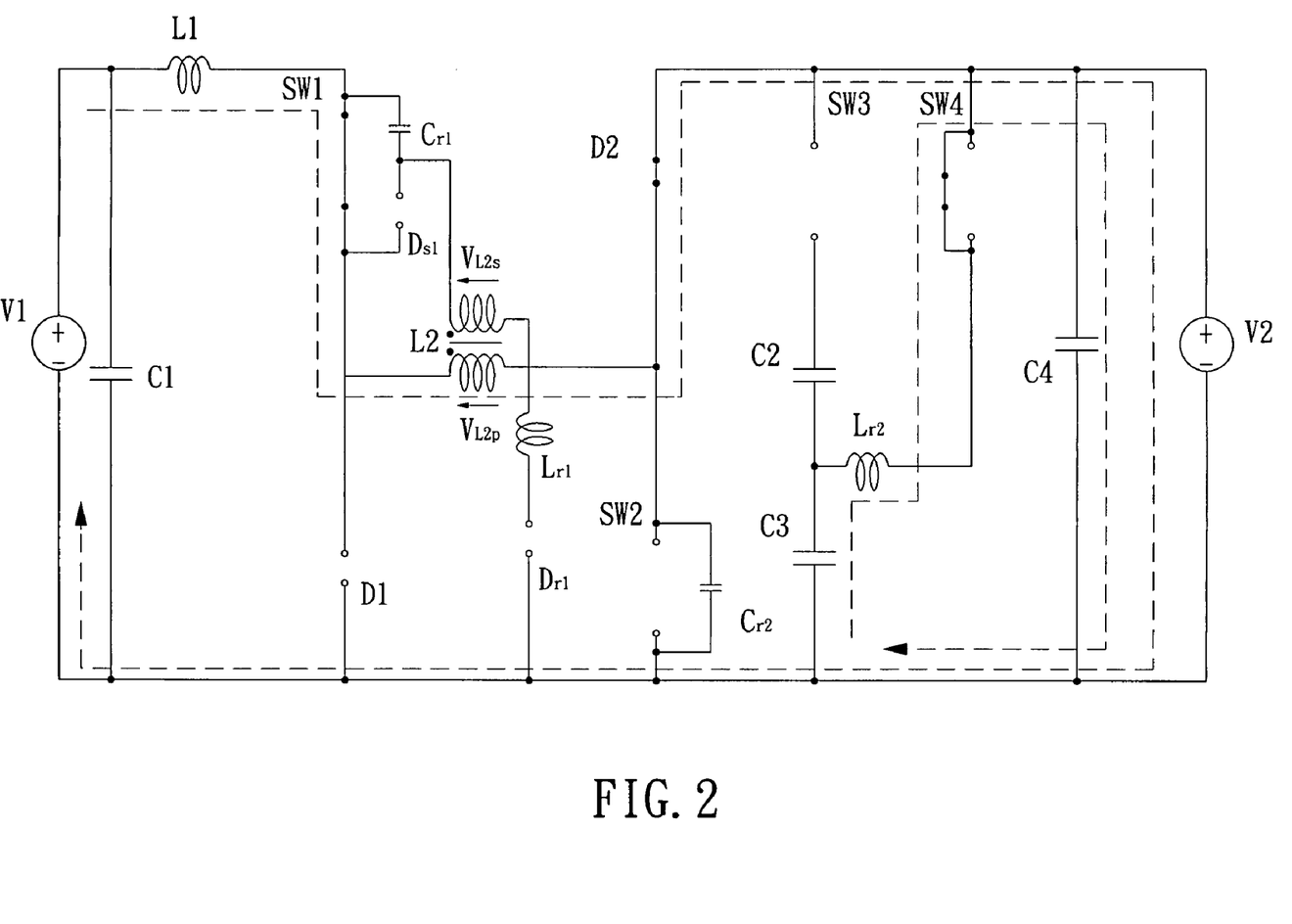
FIG. 2 is a circuit diagram showing a first operating step of a resonance circuit for use in an H-bridge DC-DC converter in FIG. 1 in a buck mode.

Please refer to FIG. 2, which is a circuit diagram showing a first operating step of a resonance circuit for use in an H-bridge DC-DC converter in FIG. 1 in a buck mode. When the first active switching element SW1 is turned on and a current flows through the second inductor L2, energy is stored in the second inductor L2. Meanwhile, a voltage $V_{L2p}$ is induced across a primary winding L21 in the second inductor L2 while zero voltage is across a first auxiliary capacitor $C_{r1}$. A voltage $V_{L2S}$ across an auxiliary winding L22 in the second inductor L2 is induced. A second auxiliary capacitor $C_{r2}$ is charged a to a rated voltage. A third and a fourth active switching elements (SW3, SW4) are turned off. Resonance is generated by discharging the energy stored in a second auxiliary inductor $L_{r2}$ through a bypass diode of the fourth active switching element SW4 and a fourth capacitor C4.

Figure 3:
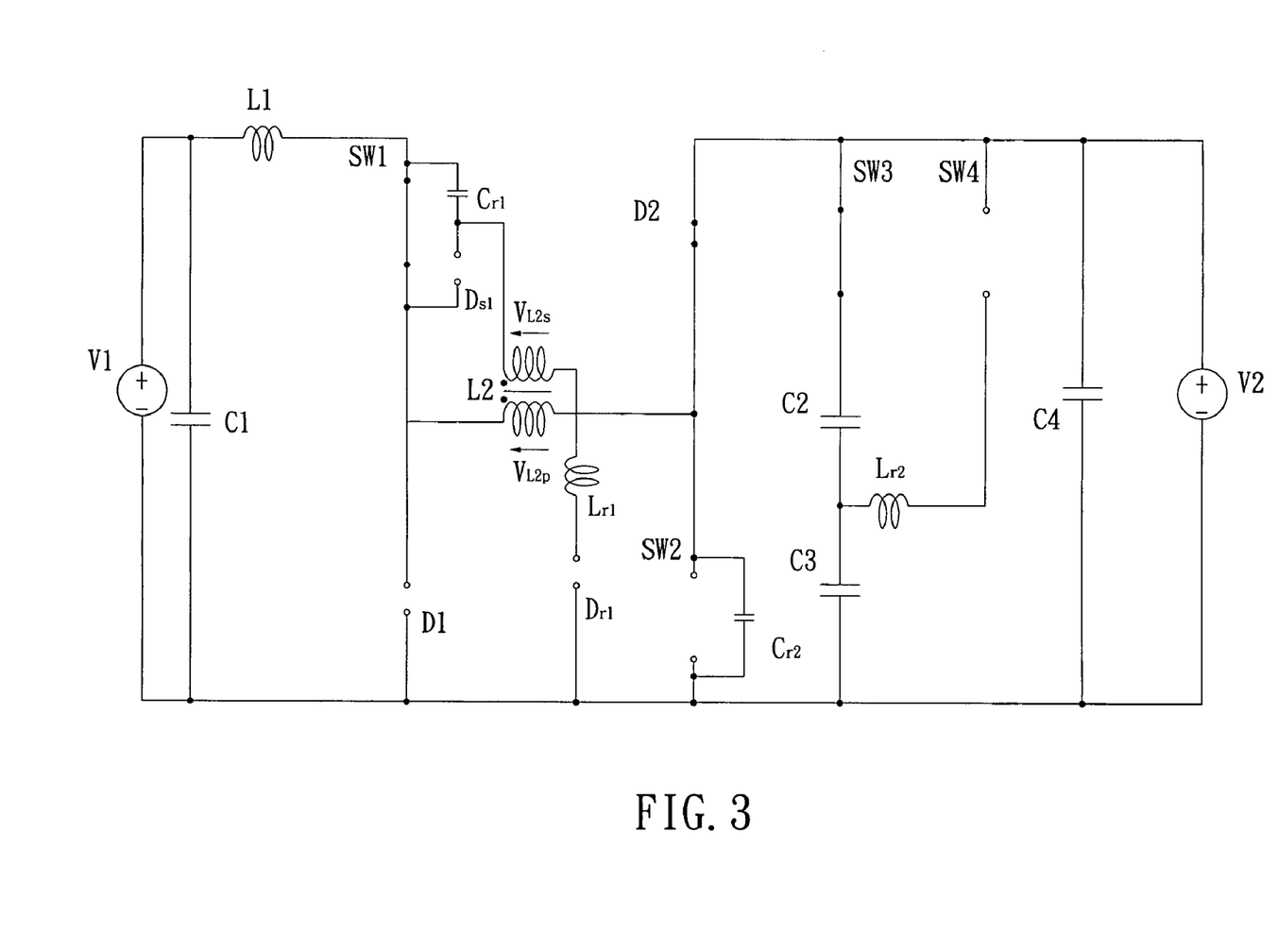
FIG. 3 is a circuit diagram showing a second operating step of a resonance circuit for use in an H-bridge DC-DC converter in FIG. 1 in a buck mode.

Please refer to FIG. 3, which is a circuit diagram showing a second operating step of a resonance circuit for use in an H-bridge DC-DC converter in FIG. 1 in a buck mode. The third active switching element SW3 is turned on after the second auxiliary capacitor $C_{r2}$ is charged to the rated voltage.

Figure 4:
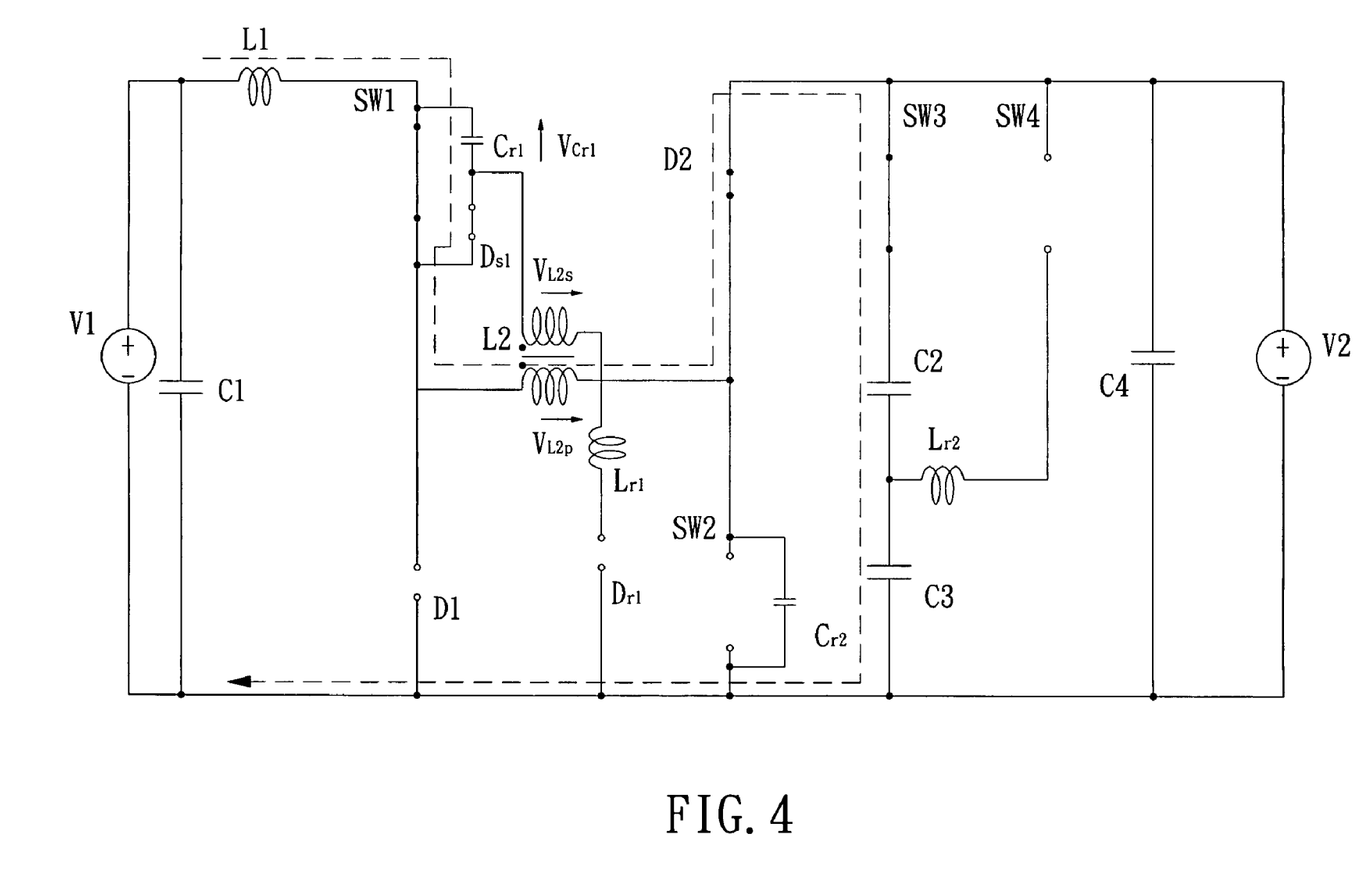
FIG. 4 is a circuit diagram showing a third operating step of a resonance circuit for use in an H-bridge DC-DC converter in FIG. 1 in a buck mode.

Please refer to FIG. 4, which is a circuit diagram showing a third operating step of a resonance circuit for use in an H-bridge DC-DC converter in FIG. 1 in a buck mode. When the first active switching element SW1 is turned off, the polarity of a voltage across a first inductor L1 is reversed. A first auxiliary capacitor $C_{r1}$ is charged when a current from the first inductor L1 flows through a first auxiliary passive switching element $D_{s1}$. Since the current from the first inductor L1 is regarded as a current source, the value of the first auxiliary capacitor $C_{r1}$ determines the voltage variation (dv/dt). The larger the value of the first auxiliary capacitor $C_{r1}$, the smaller the voltage variation. Therefore, the surge voltage resulting from the equivalent inductance can be effectively eliminated. Moreover, the polarity of the voltage $V_{L2S}$ across the auxiliary winding L22 in the second inductor L2 is reversed compared to the polarity when the first active switching element SW1 is turned on. The first auxiliary passive switching element $D_{r1}$ is reverse biased and thus is turned off.

When the first auxiliary capacitor $C_{r1}$ is fully charged and the voltage across the first auxiliary capacitor $C_{r1}$ is larger than or equal to the input voltage V1, the current from the first inductor L1 stops charging the first auxiliary capacitor $C_{r1}$. Meanwhile, the polarity of the voltage $V_{L2S}$ across the auxiliary winding L22 in the second inductor L2 is kept reversed compared to the polarity when the first active switching element SW1 is turned on and the second auxiliary passive switching element is kept reverse biased and turned off.

Figure 5:
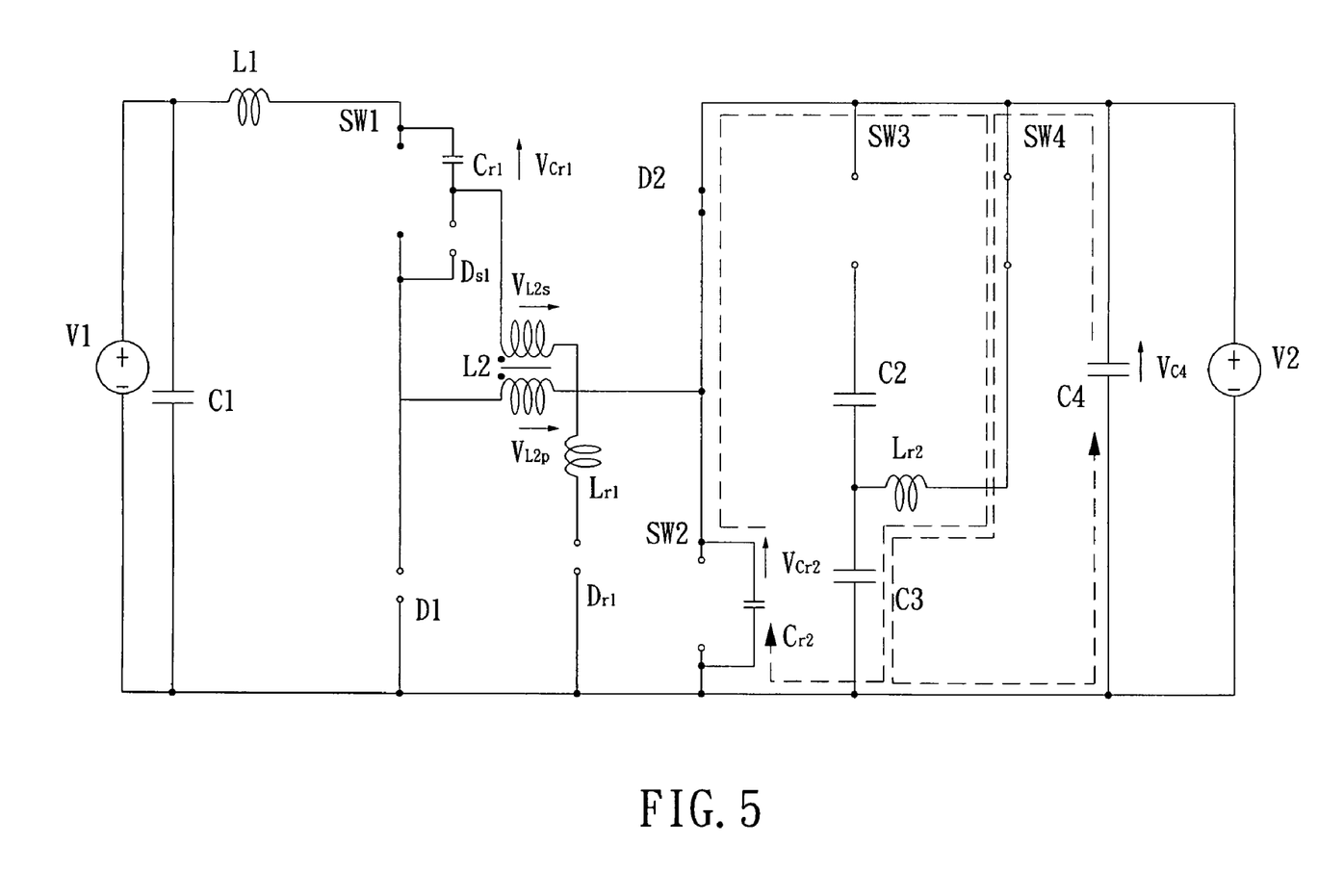
FIG. 5 is a circuit diagram showing a fourth operating step of a resonance circuit for use in an H-bridge DC-DC converter in FIG. 1 in a buck mode.

Please refer to FIG. 5, which is a circuit diagram showing a fourth operating step of a resonance circuit for use in an H-bridge DC-DC converter in FIG. 1 in a buck mode. The third active switching element SW3 is turned off when the fourth active switching element SW4 is turned on. Meanwhile, the second auxiliary capacitor $C_{r2}$ is discharged to zero voltage through the fourth active switching element SW4 and the second auxiliary inductor $L_{r2}$.

Figure 6:
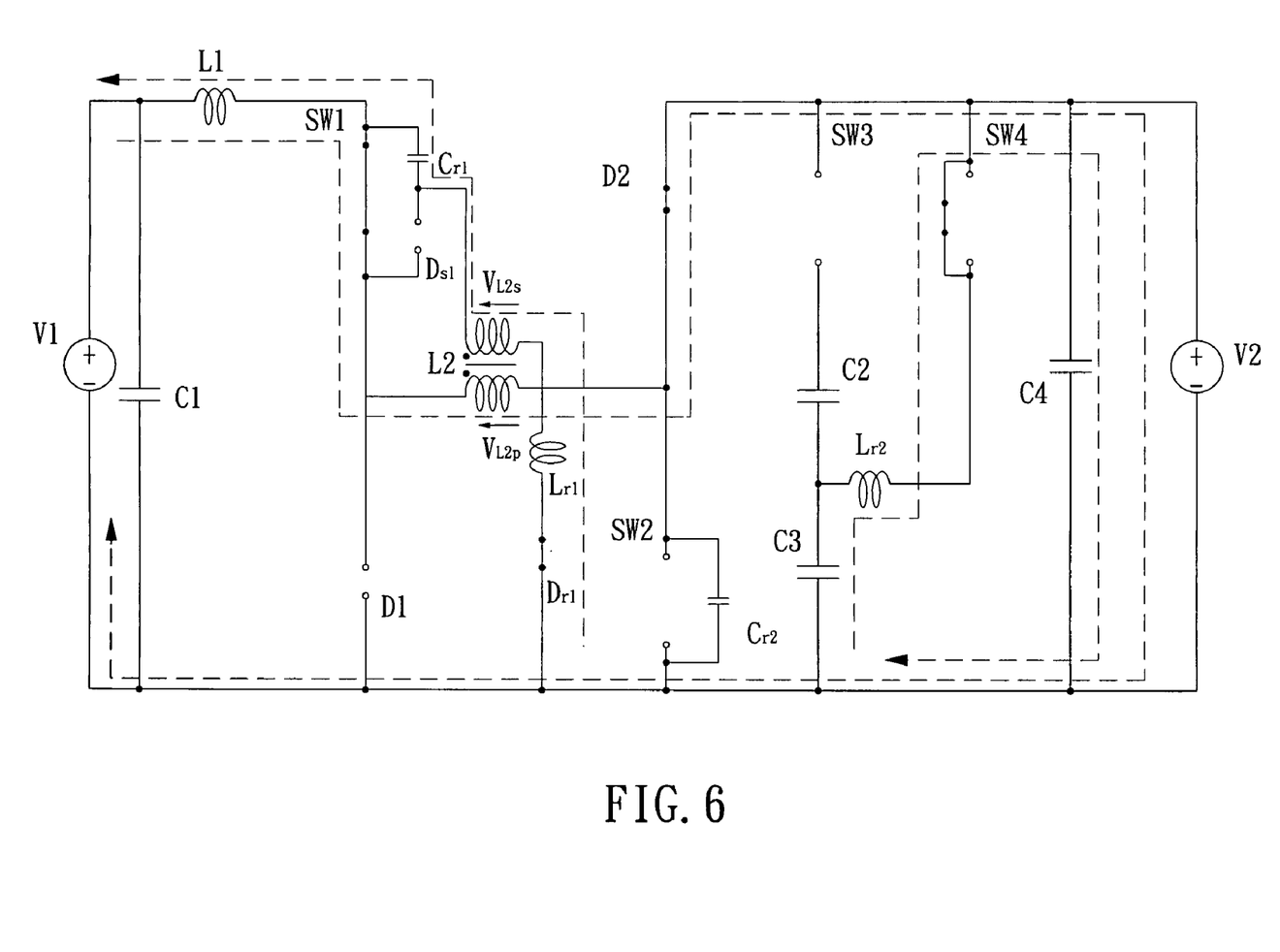
FIG. 6 is a circuit diagram showing a fifth operating step of a resonance circuit for use in an H-bridge DC-DC converter in FIG. 1 in a buck mode.

Please refer to FIG. 6, which is a circuit diagram showing a fifth operating step of a resonance circuit for use in an H-bridge DC-DC converter in FIG. 1 in a buck mode. When the first active switching element SW1 is turned on and the current flows through the second inductor L2, energy is stored in the second inductor L2. Meanwhile, the voltage $V_{L2p}$ across the primary winding L21 in the second inductor L2 is induced. The voltage $V_{L2S}$ across the auxiliary winding L22 in the second inductor L2 is induced, and the polarity is identical to the polarity when the first active switching element SW1 is turned on. The second auxiliary passive switching element $D_{r1}$ is forward biased and is thus turned on. Meanwhile, the energy stored in the first auxiliary capacitor $C_{r1}$ is delivered through the first auxiliary inductor $L_{r1}$ by resonance to the first capacitor C1.

Boost Mode

In the boost mode, the first active switching element SW1 is always turned on. The resonance circuit for use in an H-bridge DC-DC converter in FIG. 1 operates according to four operating steps as described hereinafter.

Figure 7:
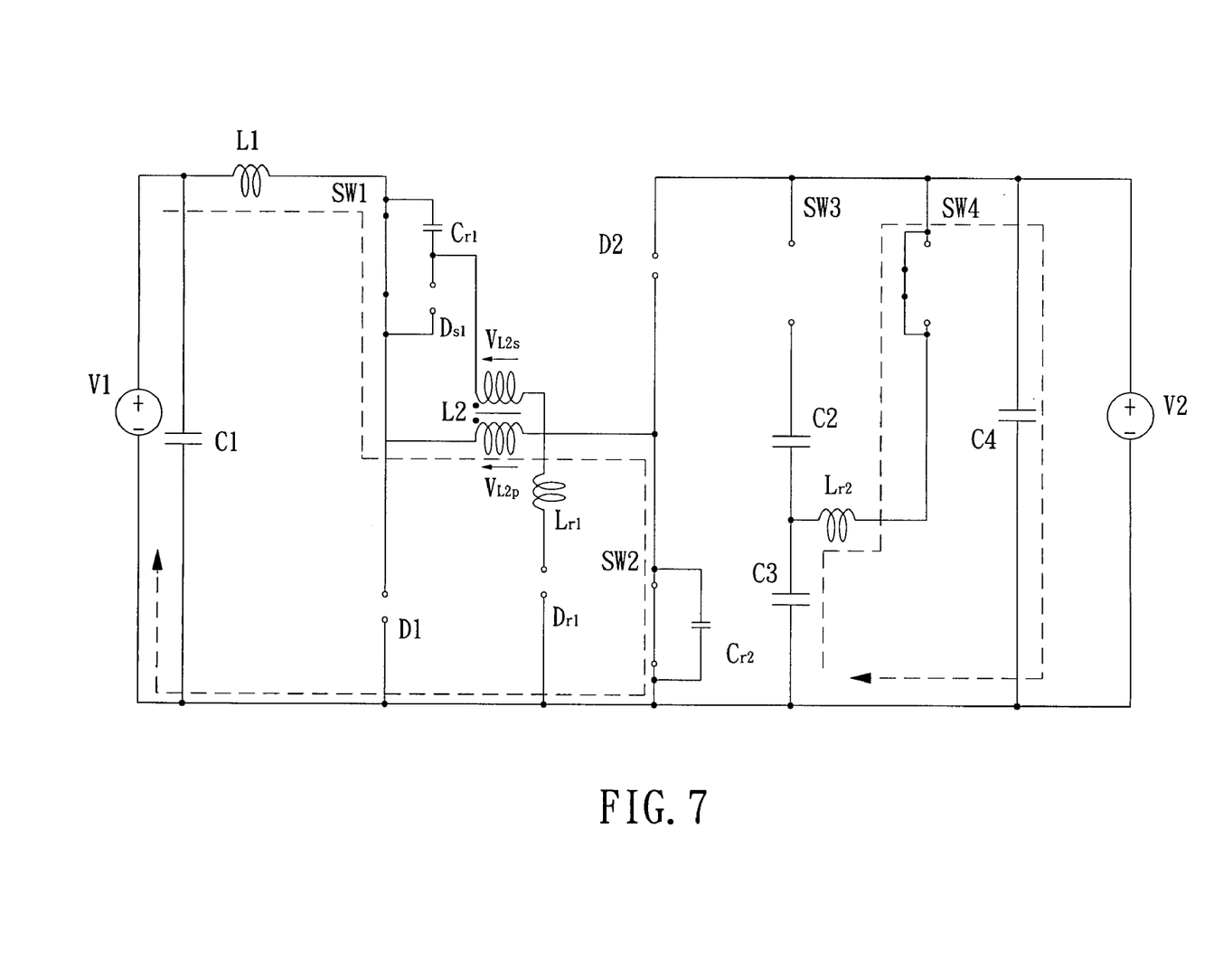
FIG. 7 is a circuit diagram showing a first operating step of a resonance circuit for use in an H-bridge DC-DC converter in FIG. 1 in a boost mode.

Please refer to FIG. 7, which is a circuit diagram showing a first operating step of a resonance circuit for use in an H-bridge DC-DC converter in FIG. 1 in a boost mode. When the second active switching element SW2 is turned on and a current flows through the second inductor L2, energy is stored in the second inductor L2. Meanwhile, a voltage $V_{L2p}$ is induced across a primary winding L21 in the second inductor L2, which is equal to an input voltage VI, while zero voltage is across a first auxiliary capacitor $C_{r1}$. A voltage $V_{L2S}$ across an auxiliary winding L22 in the second inductor L2 is induced. A third and a fourth active switching elements (SW3, SW4) are turned off. Resonance is generated in a second auxiliary inductor $L_{r2}$ and a fourth capacitor C4. The energy is delivered through a bypass diode of the fourth active switching element SW4 to the fourth capacitor C4.

Figure 8:
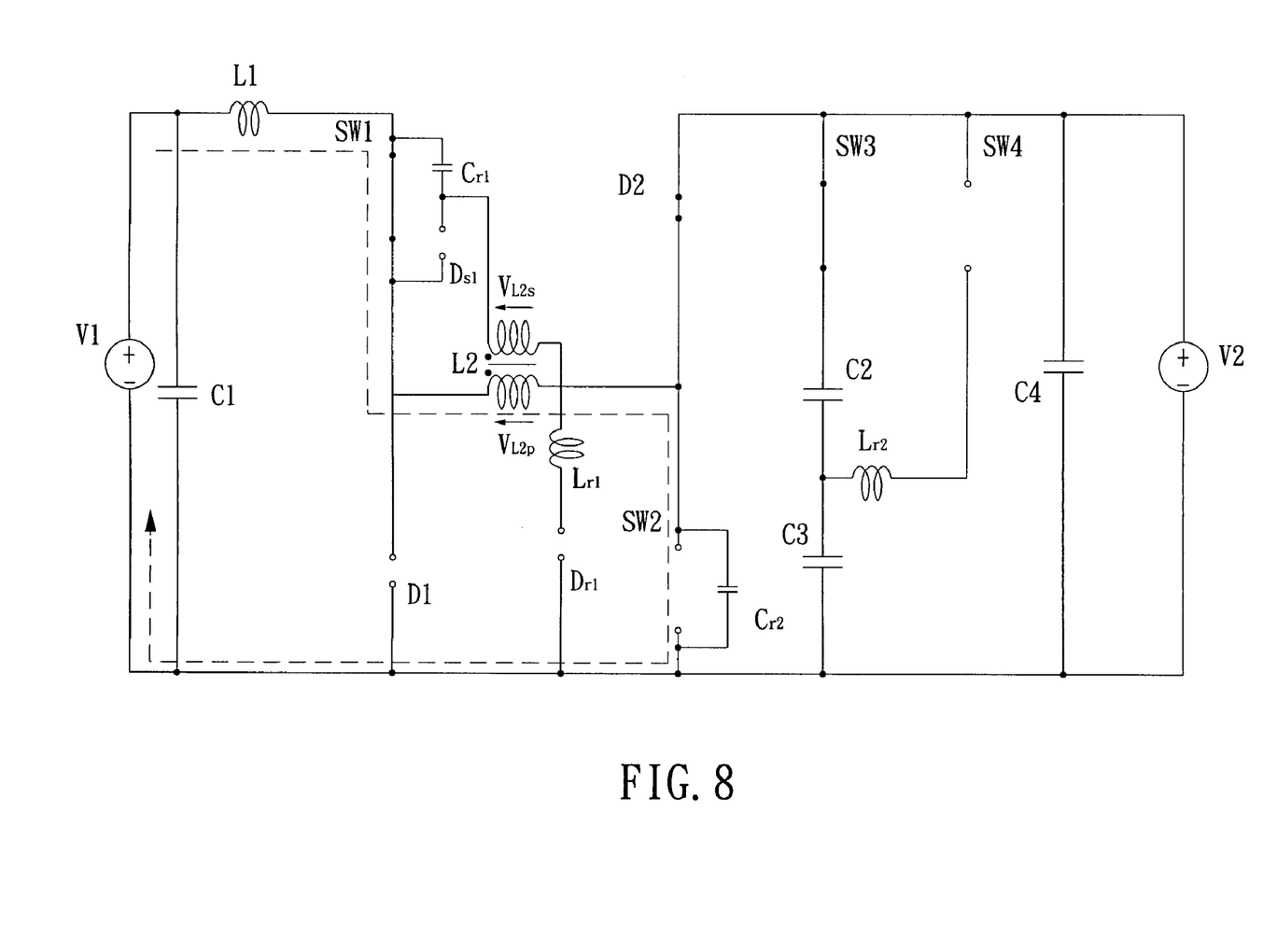
FIG. 8 is a circuit diagram showing a second operating step of a resonance circuit for use in an H-bridge DC-DC converter in FIG. 1 in a boost mode.

Please refer to FIG. 8, which is a circuit diagram showing a second operating step of a resonance circuit for use in an H-bridge DC-DC converter in FIG. 1 in a boost mode. The third active switching element SW3 is turned on after the fourth capacitor C4 is charged to a rated voltage.

Figure 9:
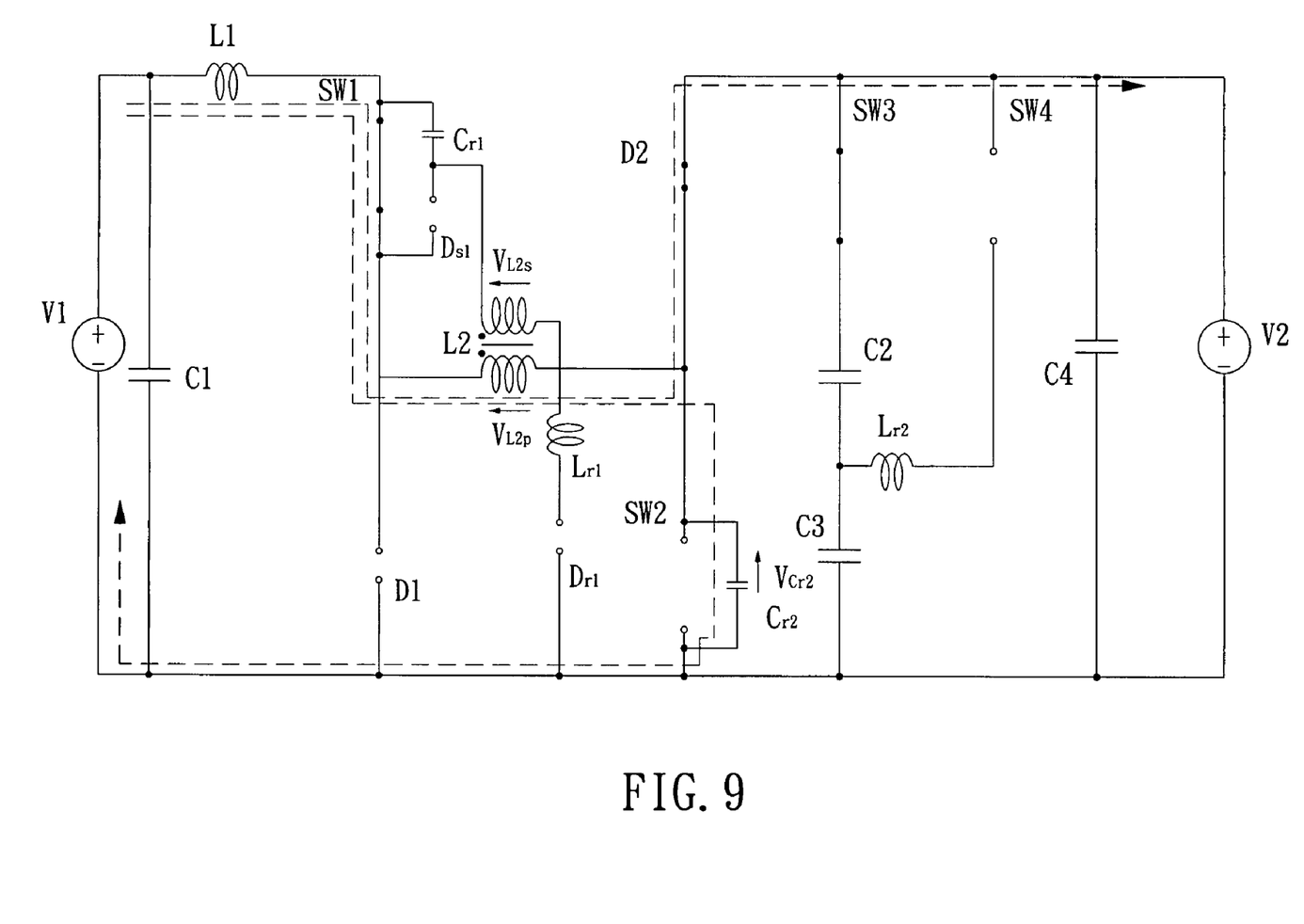
FIG. 9 is a circuit diagram showing a third operating step of a resonance circuit for use in an H-bridge DC-DC converter in FIG. 1 in a boost mode.

Please refer to FIG. 9, which is a circuit diagram showing a third operating step of a resonance circuit for use in an H-bridge DC-DC converter in FIG. 1 in a boost mode. When the second active switching element SW2 is turned off, the polarity of a voltage across a first inductor L1 is kept identical to the polarity when the second active switching element SW2 is turned on. The fourth capacitor C4 is charged when a current from the first inductor L1 flows through a second passive switching element D2. The current from the first inductor L1 charges a second auxiliary capacitor $C_{r2}$. Since the current from the first inductor L1 is regarded as a current source, the value of the second auxiliary capacitor $C_{r2}$ determines the voltage variation (dv/dt). The larger the value of the second auxiliary capacitor $C_{r2}$, the smaller the voltage variation. Therefore, the surge voltage resulting from the equivalent inductance can be effectively eliminated. When the second auxiliary capacitor $C_{r2}$ is fully charged and the voltage across the second auxiliary capacitor $C_{r2}$ is larger than or equal to an output voltage V2, the current from the first inductor L1 stops charging the second auxiliary capacitor $C_{r2}$.

Figure 10:
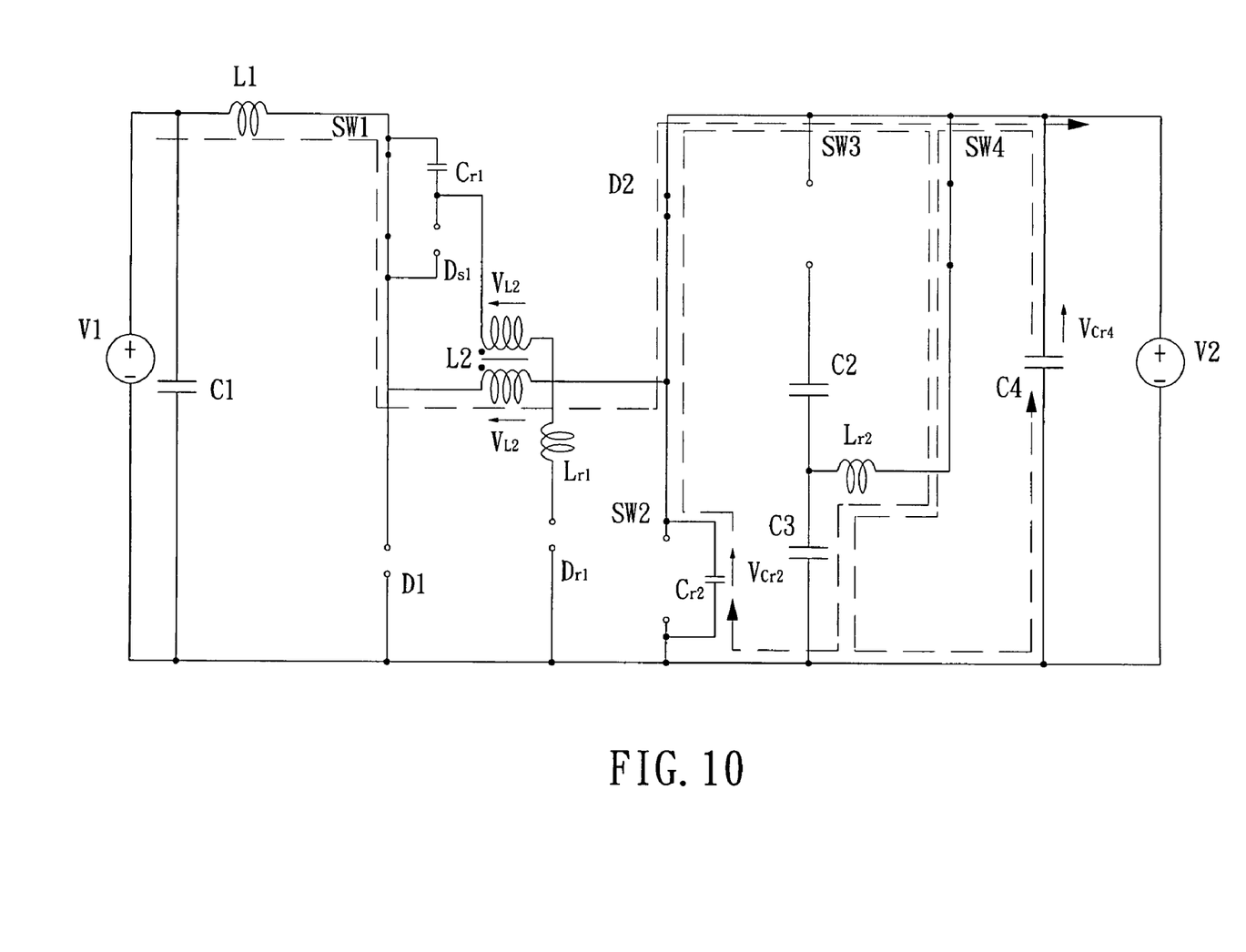
FIG. 10 is a circuit diagram showing a fourth operating step of a resonance circuit for use in an H-bridge DC-DC converter in FIG. 1 in a boost mode.

Please refer to FIG. 10, which is a circuit diagram showing a fourth operating step of a resonance circuit for use in an H-bridge DC-DC converter in FIG. 1 in a boost mode. The third active switching element SW3 is turned off when the fourth active switching element SW4 is turned on. Meanwhile, the second auxiliary capacitor $C_{r2}$ is discharged to zero voltage through the fourth active switching element SW4 and the second auxiliary inductor $L_{r2}$. Similarly, the fourth capacitor C4 is discharged through the fourth active switching element SW4 and the second auxiliary inductor $L_{r2}$.

Moreover, the first inductor L1 in FIG. 1 is capable of limiting the current variation. The first inductor L1 limits the current variation when any of the active switching elements is turned on so as to reduce the turn-on loss of the active switching elements. However, the surge voltage resulting from the first inductor L1 increases the turn-off loss of the active switching elements. Therefore, the capacitance is required to be higher so as to reduce the surge voltage and the turn-on loss of the active switching elements and improve the power conversion rate.

Figure 11:
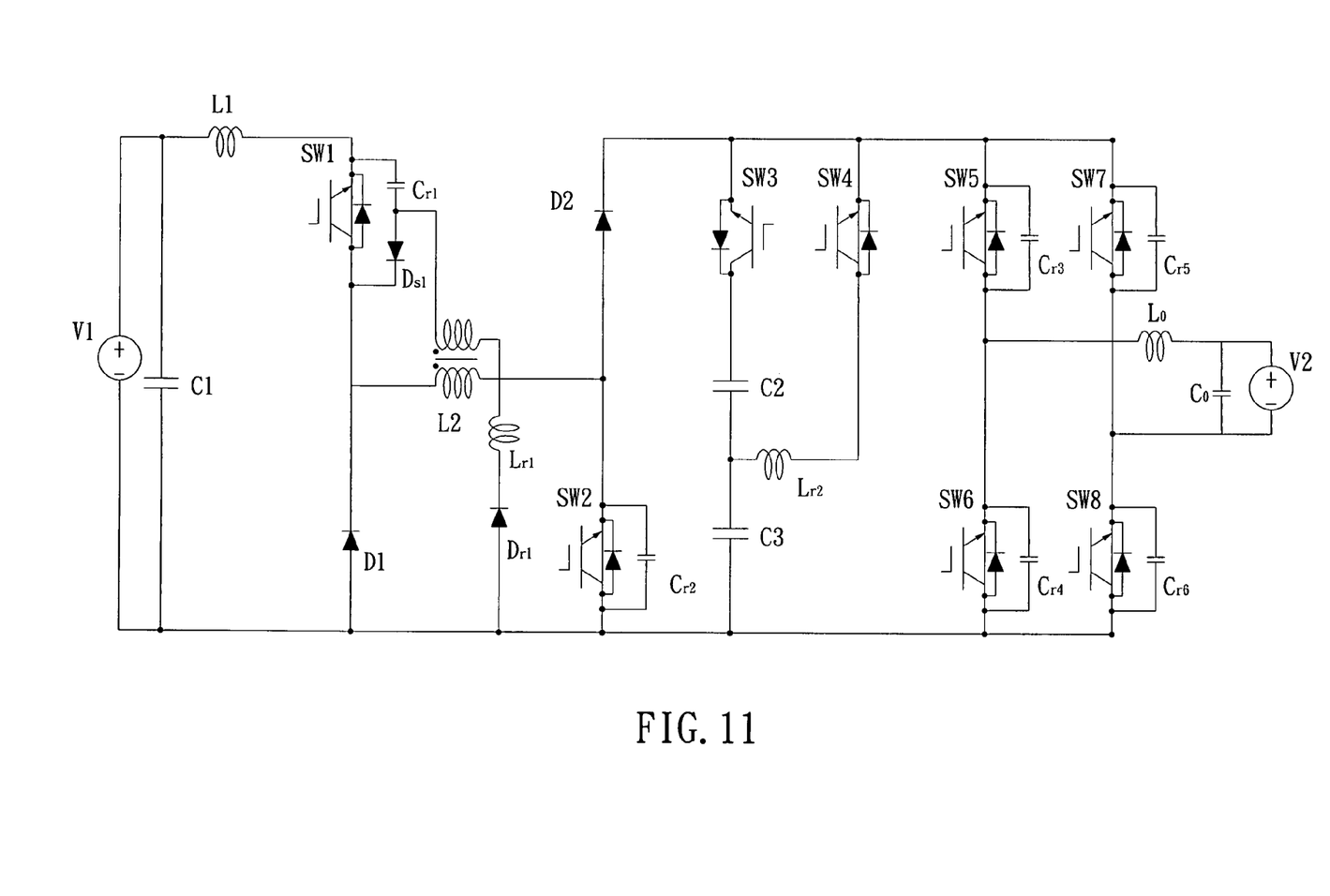
FIG. 11 is a modified circuit diagram according to FIG. 1 wherein the output is replaced by a DC-AC inverting circuit.

Additionally, the circuit in FIG. 1 can be combined with a single-phase or three-phase inverter to be re-constructed as shown in FIG. 11, which is a modified circuit diagram according to FIG. 1 wherein the output is replaced by a DC-AC inverting circuit. The DC-AC inverting circuit is disposed on the back end of the second resonance circuit. The DC-AC inverting circuit comprises: a fifth active switching element SW5, a sixth active switching element SW6, a seventh active switching element SW7 and an eighth active switching element SW8. The fifth active switching element SW5 is connected in parallel to a third auxiliary capacitor $C_{r3}$, the sixth active switching element SW6 is connected in parallel to a fourth auxiliary capacitor $C_{r4}$, the seventh active switching element SW7 is connected in parallel to a fifth auxiliary capacitor $C_{r5}$, the eighth active switching element SW8 is connected in parallel to a sixth auxiliary capacitor $C_{r6}$, and a resonance inductor comprising an output inductor $L_O$ and an output capacitor $C_O$ is disposed at the front end of the output voltage V2.

According to the circuit in FIG. 11, the auxiliary capacitors and output inductor $L_O$ are used to discharge the voltage across the active switching elements before the active switching elements are turned on. Therefore, the active switching elements are switched at zero-voltage to achieve zero-voltage switching and thus reduce the switching loss and improve the power conversion rate.

From FIG. 1 to FIG. 11, it is known that the present invention provides a resonance circuit for use in an H-bridge DC-DC converter, capable of achieving soft-switching of the switching elements to reduce switching loss and delivering the energy back to the input of the DC-DC converter using a resonance circuit to improve power conversion rate. Moreover, the switching elements are switched at zero-voltage switching to reduce the switching loss. Furthermore, the auxiliary capacitors and output inductor are used to discharge the voltage across the active switching elements before the active switching elements are turned on. Therefore, the active switching elements are switched at zero-voltage to achieve zero-voltage switching and thus reduce the switching loss and improve the power conversion rate.

According to the above discussion, it is apparent that the present invention discloses a resonance circuit for use in an H-bridge DC-DC converter using a resonance circuit to achieve soft-switching of the switches to reduce the switching loss and deliver part of the energy back to the AC utility and improve the power conversion rate. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A resonance circuit for use in an H-bridge DC-DC converter, the resonance circuit comprising:
   an H-bridge converter, capable of converting unstable DC power into stable DC power, the H-bridge converter comprising:
      a first active switching element and a second active switching element;
      a coupled inductor with dual windings capable of storing energy; and
      a first passive switching element and a second passive switching element;
   a first resonance circuit, disposed on a buck side of the H-bridge converter for reducing the turn-off loss of the first active switching element, the first resonance circuit comprising:
      a first inductor, a second inductor, a first auxiliary inductor, a first passive auxiliary switching element, a second passive auxiliary switching element and a first auxiliary capacitor;
      wherein the second inductor comprises a primary winding and an auxiliary winding;
   a second resonance circuit, disposed on a boost side of the H-bridge converter for reducing the turn-on loss of the second active switching element, the second resonance circuit comprising:
      a second auxiliary inductor, a third active switching element, a first auxiliary inductor, the first passive auxiliary switching element, a third capacitor, a fourth capacitor and a second auxiliary capacitor; and
   wherein the first resonance circuit and the second resonance circuit are connected using:
      the first auxiliary capacitor being connected in series to the first passive auxiliary switching element connected in parallel to the first active switching element; and
      the negative end of the second passive auxiliary switching element being connected in series to the joint of the first auxiliary capacitor and the first auxiliary passive switching element through the first auxiliary inductor and the auxiliary winding of a second inductor while the positive end of the second auxiliary passive switching element being connected to the negative end of an input power.

2. The resonance circuit for use in an H-bridge DC-DC converter as recited in claim 1, wherein the first inductor is disposed in the first resonance circuit or the second resonance circuit.

3. The resonance circuit for use in an H-bridge DC-DC converter as recited in claim 1, wherein the first inductor is capable of limiting the current variation so as to reduce the turn-on loss when any of the active switching elements is turned on.

4. The resonance circuit for use in an H-bridge DC-DC converter as recited in claim 1, wherein the first auxiliary inductor is equal to the leakage inductance from the auxiliary winding of the second inductor.

5. The resonance circuit for use in an H-bridge DC-DC converter as recited in claim 1, wherein the primary winding and the auxiliary winding of the second inductor use a common iron core.

6. A resonance circuit for use in an H-bridge DC-DC converter, the resonance circuit comprising:
   an H-bridge converter, capable of converting unstable DC power into stable DC power, the H-bridge converter comprising:
      a first active switching element and a second active switching element;
      a coupled inductor with dual windings capable of storing energy; and
      a first passive switching element and a second passive switching element;
   a first resonance circuit, disposed on a buck side of the H-bridge converter for reducing the turn-off loss of the first active switching element, the first resonance circuit comprising:
      a first inductor, a second inductor, a first auxiliary inductor, a first passive auxiliary switching element, a second passive auxiliary switching element and a first auxiliary capacitor; and
   wherein the second inductor comprises a primary winding and an auxiliary winding;
   a second resonance circuit, disposed on a boost side of the H-bridge converter for reducing the turn-on loss of the second active switching element, the second resonance circuit comprising:
      a second auxiliary inductor, a third active switching element, a first auxiliary inductor, the first passive auxiliary switching element, a third capacitor, a fourth capacitor and a second auxiliary capacitor; and
   a DC-AC inverting circuit, disposed on the back end of the second resonance circuit, comprising:
      a fifth active switching element, a sixth active switching element, a seventh active switching element, and an eighth active switching element, wherein the fifth active switching element is connected in parallel to a third auxiliary capacitor, the sixth active switching element is connected in parallel to a fourth auxiliary capacitor, the seventh active switching element is connected in parallel to a fifth auxiliary capacitor, the eighth active switching element is connected in parallel to a sixth auxiliary capacitor, and a resonance inductor comprising an output inductor and an output capacitor is disposed at the front end of the output voltage.

7. The resonance circuit, as recited in claim 1, is applicable to operate in a buck mode and a boost mode.

* * * * *